April 22, 1930.  B. E. DOHNER  1,755,210

METHOD OF MAKING COUPLINGS

Filed Aug. 5, 1927

INVENTOR,
Bert E. Dohner,
BY
ATTORNEY

Patented Apr. 22, 1930

1,755,210

UNITED STATES PATENT OFFICE

BURT E. DOHNER, OF OAKWOOD, NEAR DAYTON, OHIO

METHOD OF MAKING COUPLINGS

Application filed August 5, 1927. Serial No. 210,983.

This invention relates to a new and useful method of making a coupling.

It is the principal object of my invention to provide a method of coupling two cylindrical members. Under this method a compression sleeve which is made a part of the coupling nut of a tube coupling, may be separated from the nut within the fitting by breaking a thin wall connection between the nut and sleeve. The nut, as a disconnected element, may then be forced more tightly around the tube to more thoroughly accommodate itself to any irregularities in the latter or the taper of the fitting. A soft metal tube or rod may thus be connected to a fitting with extreme permanence and rigidity without the use of solder or soft packing.

Other important and incidental objects will be brought out in the following specification and particularly set forth in the subjoined claims.

Figure 1:
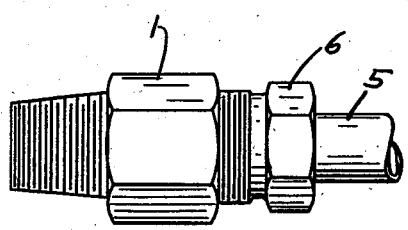
Figure 2:
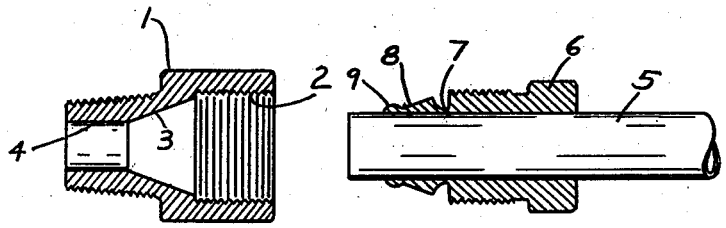
Figure 3:
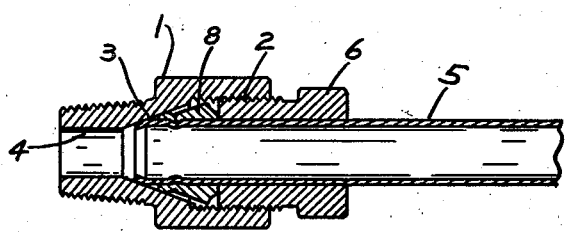
Figure 4:
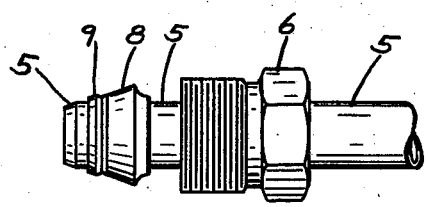

In the accompanying drawings illustrating my invention, Figure 1 is a side elevational view of the coupling assembled. Figure 2 is a sectional view of the coupling before it is assembled. Figure 3 is a longitudinal sectional view taken through the coupling after it has been tightened up. And Figure 4 is a side view of the compression sleeve tightly compressed upon a tube, showing the nut disconnected from it upon the tube.

Referring to the accompanying drawings for a detailed description of my invention, the numeral 1 designates a fitting formed with a threaded nut receiving bore 2 communicating through a tapered portion 3 with a hole 4.

For the purpose of connecting a member such as the tube 5 to the fitting 1, I provide a coupling nut 6 adapted to be screwed into the interiorly threaded portion 2 of the fitting. Connected by a thin wall 7 of reduced diameter to the front end of the coupling nut is a compression sleeve 8 of frustro-conical section and having a bead 9 turned upon it near its front end.

When the fitting 1 has been applied to the tube 5, as shown in Figure 3, the nut 6 is screwed into the fitting to force the compression sleeve 8 against the taper 3 of it and tightly around the tube. When pressure is applied against the body of the sleeve by the nut, the thin connecting wall 7 between it and the sleeve will be broken, whereupon the sleeve, as a separate piece, will be forced by the nut tightly against the taper of the fitting and around the tube to form a rigid, non-leaking connection between them. The breaking of the connection between the nut and sleeve enables the latter to be more tightly forced around the tube and the better to accommodate itself to irregularities in the tube and the taper.

Having described my invention, I claim:

1. The method of coupling two cylindrical members, which consists in forming one member with a threaded recess having a tapering inner end to receive the other member, then applying a thinly connected double sleeve unit to the cylindrical member, the rear part of said unit being threaded and its front part being compressible, then forcing said unit into the recess until the connection between its front and rear parts is broken, and then forcing the compressible part of the unit as a separate piece into the tapering end of the recess, by screwing the threaded part of the unit further into the recess, for the purpose specified.

2. The method of connecting a soft metal cylindrical member to a fitting having a threaded recess to receive the other member, said recess having a tapering inner end, which consists in applying to said cylindrical member a compression sleeve and a nut connected by a thin wall, then screwing the nut into the fitting to force the compression sleeve into said recess to break the thin wall between the sleeve and the nut, and thereafter screwing the nut further into the fitting to force the sleeve as a separate piece into the tapering portion of the recess of the fitting, for the purpose specified.

In witness whereof I have hereunto set my hand this 2nd day of August, 1927.

BURT E. DOHNER.